(12) United States Patent
Dabak et al.

(10) Patent No.: US 9,155,056 B2
(45) Date of Patent: *Oct. 6, 2015

(54) MAPPING SCHEMES FOR SECONDARY SYNCHRONIZATION SIGNAL SCRAMBLING

(71) Applicant: TEXAS INSTRUMENTS INCORPORATED, Dallas, TX (US)

(72) Inventors: Anand Ganesh Dabak, Plano, TX (US); Eko Nugroho Onggosanusi, Allen, TX (US); Badri Varadaharajan, Mountain View, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/481,894

(22) Filed: Sep. 9, 2014

(65) Prior Publication Data

US 2015/0055624 A1 Feb. 26, 2015

Related U.S. Application Data

(63) Continuation of application No. 13/437,719, filed on Apr. 2, 2012, now Pat. No. 8,830,984, which is a continuation of application No. 13/239,860, filed on Sep. 22, 2011, now Pat. No. 8,175,077, which is a (Continued)

(51) Int. Cl.
*H04W 56/00* (2009.01)
*H04W 36/00* (2009.01)
(Continued)

(52) U.S. Cl.
CPC .......... *H04W 56/001* (2013.01); *H04B 7/2681* (2013.01); *H04J 11/0069* (2013.01);

(Continued)

(58) Field of Classification Search
CPC .......... H04W 56/001; H04W 36/0016; H04W 56/0015; H04J 11/0069; H04J 2011/0096; H04L 9/12; H04L 2209/80; H04B 7/2681
See application file for complete search history.

(56) References Cited

U.S. PATENT DOCUMENTS 7,102,994 B2   9/2006   Sezgin et al.
7,920,598 B2   4/2011   Luo (Continued)

OTHER PUBLICATIONS

"Cell-Specific Signals for Initial Synchronization and Cell Identification", 3GPP TSG RAN WG1 LTE Ad Hoc, R1-060225, Heisinki, Finland, Jan. 23-25, 2006.

(Continued)

*Primary Examiner* — Brian D Nguyen
(74) *Attorney, Agent, or Firm* — Ronald O. Neerings; Frank D. Cimino

(57) ABSTRACT

Embodiments of the present disclosure provide a transmitter, a receiver and methods of operating a transmitter and a receiver. In one embodiment, the transmitter includes a synchronization unit configured to provide a primary synchronization signal and a secondary synchronization signal having first and second segments. The transmitter also includes a secondary scrambling unit configured to provide a scrambled secondary synchronization signal, wherein scrambling agents for the first and second segments are derived from a primary synchronization sequence of the primary synchronization signal. The secondary scrambling unit is further configured to provide an additional scrambling of one of the first and second segments, wherein a second scrambling agent is derived from the remaining segment of a secondary synchronization sequence of the secondary synchronization signal. The transmitter further includes a transmit unit configured to transmit the primary synchronization signal and the scrambled secondary synchronization signal.

52 Claims, 6 Drawing Sheets

Related U.S. Application Data continuation of application No. 12/140,789, filed on Jun. 17, 2008, now Pat. No. 8,054,823.

(60) Provisional application No. 60/944,681, filed on Jun. 18, 2007.

(51) Int. Cl.
*H04B 7/26* (2006.01)
*H04L 9/12* (2006.01)
*H04J 11/00* (2006.01)

(52) U.S. Cl.
CPC ............ *H04L 9/12* (2013.01); *H04W 36/0016* (2013.01); *H04W 56/0015* (2013.01); *H04J 2011/0096* (2013.01); *H04L 2209/80* (2013.01)

(56) References Cited

U.S. PATENT DOCUMENTS

| | | | |
|---|---|---|---|
| 7,965,689 B2 | 6/2011 | Akita et al. | |
| 8,009,661 B2 | 8/2011 | Lindoff et al. | |
| 8,130,863 B2 | 3/2012 | Han et al. | |
| 8,179,810 B2 | 5/2012 | Onggosanusi et al. | |
| 8,189,557 B2 | 5/2012 | Onggosanusi et al. | |
| 8,279,909 B2 | 10/2012 | Noh et al. | |
| 8,320,360 B2 | 11/2012 | Fukuta et al. | |
| 8,385,318 B2 | 2/2013 | Tanno et al. | |
| 8,649,401 B2 | 2/2014 | Luo et al. | |
| 2002/0097705 A1* | 7/2002 | Sezgin et al. | 370/347 |
| 2003/0095516 A1* | 5/2003 | Ok et al. | 370/331 |
| 2003/0169702 A1* | 9/2003 | Ryu et al. | 370/320 |
| 2003/0193926 A1* | 10/2003 | Lindoff et al. | 370/350 |
| 2003/0202541 A1* | 10/2003 | Lim et al. | 370/503 |
| 2005/0008040 A1 | 1/2005 | Becker et al. | |
| 2006/0114942 A1 | 6/2006 | Jang | |
| 2006/0274843 A1 | 12/2006 | Koo et al. | |
| 2007/0211838 A1* | 9/2007 | Pike et al. | 375/354 |
| 2008/0025287 A1 | 1/2008 | Whittaker | |
| 2008/0130625 A1 | 6/2008 | Sato | |
| 2008/0151839 A1* | 6/2008 | Litwin et al. | 370/336 |
| 2008/0240072 A1 | 10/2008 | Bykovnikov | |
| 2008/0285538 A1 | 11/2008 | Wu | |
| 2008/0298326 A1 | 12/2008 | Pande et al. | |
| 2009/0161652 A1 | 6/2009 | Chang et al. | |

OTHER PUBLICATIONS

"SCH structure and Cell Search Method for E-UTRA Downlink", 3GPP TSG RAN WG1 LTE Ad Hoc, R1-061662, Cannes, France, Jun. 27-30, 2006.
"Hierarchical SCH Design", 3GPP TSG RAN WG1 Meeting #46, R1-062289, Tallinn, Estonia, Aug. 28, 2006 thru Sep. 1, 2006.
"Comparison of Hierarchical Cell Search Alternatives With and Without Cell ID Grouping", 3GPP TSG RAN WG1 #47, R1-063031, Riga, Latvia, Nov. 6-10, 2006.
"Three-Step Cell Search Method for E-UTRA", 3GPP TSG RAN WG1 Meeting #47, R1-063304, Riga, Latvia, Nov. 6-10, 2006.
"S-SCH Structure for EUTRA Cell Search", 3GPP TSG RAN1 WG1 #47 Bis, R1-070020, Sorrento, Italy, Jan. 15-19, 2007.
"Comparing Different S-SCH Structures for E-UTRA Cell Search", R1-071470, Saint Julian's, Malta, Mar. 26-30, 2007.
"Secondary Synchronization Signal Design", 3GPP TSG-RAN WG1 #48-Bis, R1-071584, Malta, Mar. 26-30, 2007.
3rd Generation Partnership Project; Technical Specification Group Radio Access Network; Evolved Universal Terrestrial Radio Access (E-UTRA); Physical Channels and Modulation (Release 8); 3GPP TS 36.211 V8.2.0 (Mar. 2008).
3rd Generation Partnership Project; Technical Specification Group Radio Access Network; Evolved Universal Terrestrial Radio Access (E-UTRA); Physical Channels and Modulation (Release 8); 3GPP TS 36.211 V8.9.0 (Dec. 2009).
3rd Generation Partnership Project; Technical Specification Group Radio Access Network; Evolved Universal Terrestrial Radio Access (E-UTRA); Physical Channels and Modulation (Release 10); 3GPP TS 36.211 V10.4.0 (Dec. 2011).
3rd Generation Partnership Project; Technical Specification Group Radio Access Network; Evolved Universal Terrestrial Radio Access (E-UTRA); Radio Resource Control (RRC); Protocol specification (Release 10); 3GPP TS 36.331 V10.5.0 (Mar. 2012).

\* cited by examiner

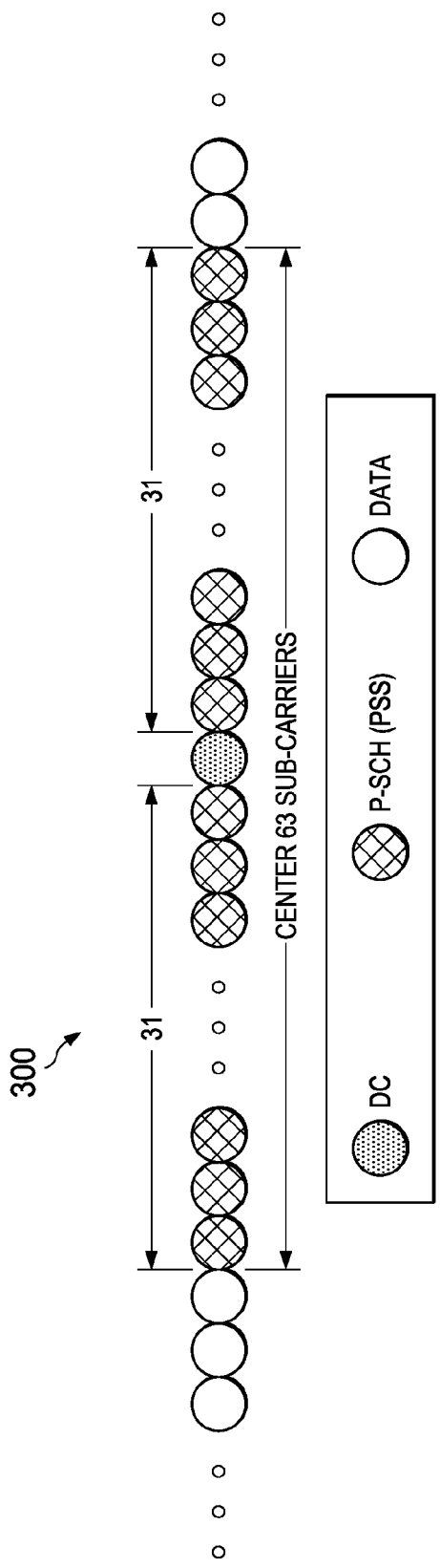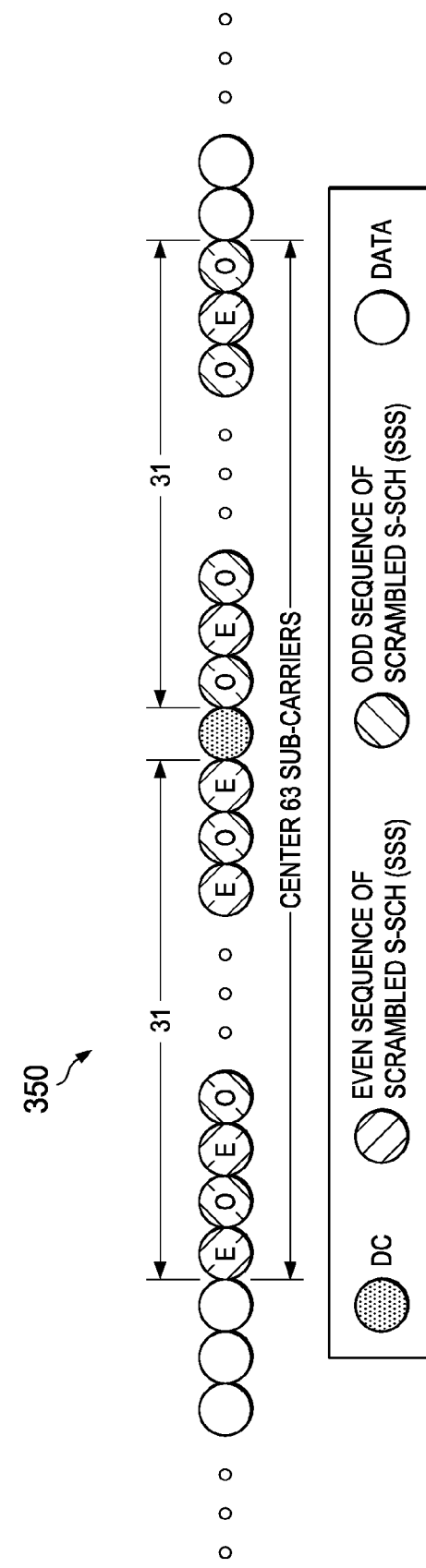

MAPPING SCHEMES FOR SECONDARY SYNCHRONIZATION SIGNAL SCRAMBLING

CROSS-REFERENCE TO PROVISIONAL APPLICATIONS

This application is a Continuation of application Ser. No. 13/437,719 filed Apr. 2, 2012, now U.S. Pat. No. 8,830,984, which is a Continuation of application Ser. No. 13/239,860 filed Sep. 22, 2011, now U.S. Pat. No. 8,175,077, which is a Continuation of application Ser. No. 12/140,789 filed Jun. 17, 2008, now U.S. Pat. No. 8,054,823, which claims the benefit of U.S. Provisional Application No. 60/944,681 entitled "PSC to SSC Scrambling Mapping" to Anand G. Dabak and Eko N. Onggosanusi filed on Jun. 18, 2007, which is incorporated herein by reference in its entirety.

This application also claims the benefit of U.S. Provisional Application No. 60/945,241 entitled "PSC to SSC Scrambling tapping" to Anand G. Dabak and Eko N. Onggosanusi filed on Jun. 20, 2007, which is incorporated herein by reference in its entirety.

This application additionally claims the benefit of U.S. Provisional Application No. 60/945,644 entitled "PSC to SSC Scrambling Mapping" to Anand G. Dabak, Eko N. Onggosanusi and Badri Varadarajan filed on Jun. 22, 2007, which is incorporated herein by reference in its entirety.

This application further claims the benefit of U.S. Provisional Application No. 60/354,692 entitled "PSC to SSC Scrambling Mapping" to Anand G. Dabak and Eko N. Onggosanusi filed on Aug. 8, 2007, which is incorporated herein by reference in its entirety.

TECHNICAL FIELD

The present disclosure is directed, in general, to a communication system and, more specifically, to a transmitter, a receiver and methods of operating a transmitter and a receiver.

BACKGROUND

In a cellular network, such as one employing orthogonal frequency division multiple access (OFDMA), each cell employs a base station that communicates with user equipment, such as a cell phone, a laptop, or a PDA, that is actively located within its cell. When the user equipment is first turned on, it has to do an initial cell search in order to be connected to the cellular network. This involves a downlink synchronization process between the base station and the user equipment wherein the base station sends a synchronization signal to the user equipment. In addition, as the moving user equipment approaches a cell boundary between two adjoining cells, it performs a neighboring cell search in preparation to handover its activation from the initial cell to the neighboring cell. Improvements in the synchronization process would prove beneficial in the art.

SUMMARY

Embodiments of the present disclosure provide a transmitter, a receiver and methods of operating a transmitter and a receiver. In one embodiment, the transmitter includes a synchronization unit configured to provide a primary synchronization signal and a secondary synchronization signal having first and second segments. The transmitter also includes a secondary scrambling unit configured to provide a scrambled secondary synchronization signal wherein scrambling agents for the first and second segments are derived from a primary synchronization sequence of the primary synchronization signal. The secondary scrambling unit is further configured to provide an additional scrambling of one of the first and second segments, wherein a second scrambling agent is derived from the remaining segment of a secondary synchronization sequence of the secondary synchronization signal. The transmitter further includes a transmit unit configured to transmit the primary synchronization signal and the scrambled secondary synchronization signal.

In one embodiment, the receiver includes a receive unit configured to receive a primary synchronization signal and a scrambled secondary synchronization signal having even and odd segments. The receiver also includes a primary synchronization unit configured to detect the primary synchronization signal. The receiver further includes a secondary synchronisation unit configured to detect the scrambled secondary synchronization signal having a scrambling agent for the even and odd segments, wherein the scrambling agent is derived from a primary synchronization sequence of the primary synchronization signal. The secondary synchronization unit is further configured to detect the scrambled secondary synchronization signal having an additional scrambling of one of the even and odd segments, wherein a second scrambling agent is derived from a remaining segment of a secondary synchronization sequence of a secondary synchronization signal.

In another aspect, the method of operating the transmitter includes providing a primary synchronization signal and a secondary synchronization signal having first and second segments. The method of operating the transmitter also includes providing a scrambled secondary synchronization signal, wherein scrambling agents for the first and second segments are derived from a primary synchronization sequence of the primary synchronization signal. The method of operating the transmitter further includes further providing an additional scrambling of one of the first and second segments, wherein a second scrambling agent is derived from the remaining segment of a secondary synchronization sequence of the secondary synchronization signal. The method of operating the transmitter still further includes transmitting the primary synchronization signal and the scrambled secondary synchronization signal.

In yet another aspect, the method of operating the receiver includes receiving a primary synchronization signal and a scrambled secondary synchronisation signal having even and odd segments. The method of operating the receiver also includes detecting the primary synchronization signal. The method of operating the receiver further include detecting the scrambled secondary synchronization signal having a scrambling agent for the even and odd segments, wherein the scrambling agent is derived from a primary synchronization sequence of the primary synchronization signal. The method of operating the receiver still further includes further detecting the scrambled secondary synchronization signal having an additional scrambling of one of the even and odd segments, wherein a second scrambling agent is derived from a remaining segment of a secondary synchronization sequence of a secondary synchronization signal.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION OF THE DRAWING

For a more complete understanding of the present disclosure, reference is now made to the following descriptions taken in conjunction with the accompanying drawings, in which:

FIG. 3A illustrates an embodiment of a primary synchronization signal constructed according to the principles of the present disclosure;

FIG. 3B illustrates an embodiment of a scrambled secondary synchronization signal (S-SCH) mapping based on employing two segments and constructed according to the principles of the present disclosure;

DETAILED DESCRIPTION

Figure 1:
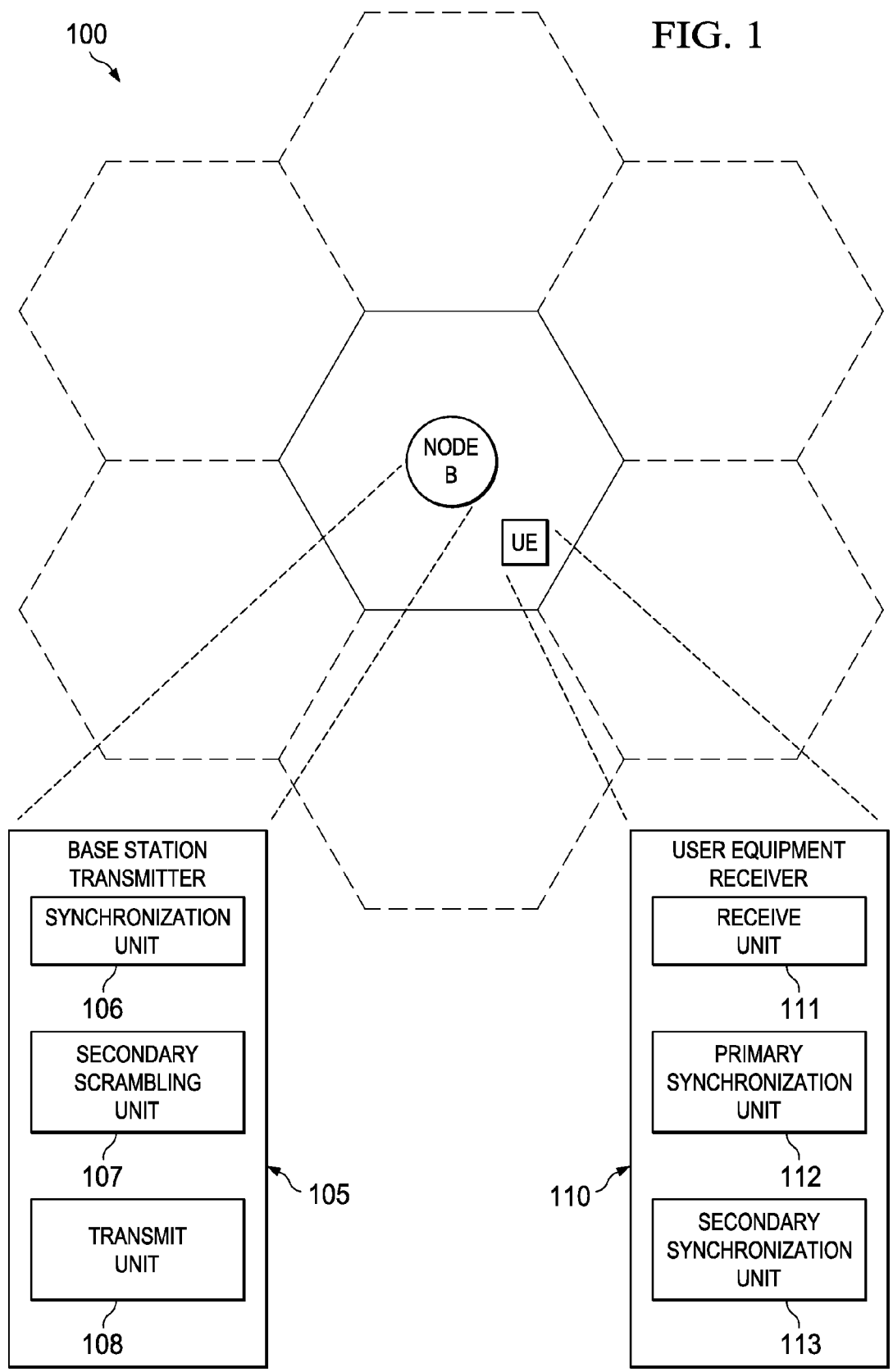
FIG. 1 illustrates an exemplary diagram of an embodiment of a cellular network constructed according to the principles of the present disclosure.

FIG. 1 illustrates an exemplary diagram of an embodiment of a cellular network 100 constructed according to the principles of the present disclosure. The cellular network 100 is part of an OFDMA system and includes a cellular grid having a centric cell and six surrounding first-tier cells. The centric cell employs a centric base station (NodeB), as shown.

The NodeB includes a base station transmitter 105 having a synchronization unit 106, a secondary scrambling unit 107 and a transmit unit 108. The cellular network 100 also includes user equipment (UE) operating within the centric cell, wherein the NodeB acts as a serving base station to the UE. The UE includes a UE receiver 110 having a receive unit 111, a primary synchronization unit 112 and a secondary synchronization unit 113.

In the base station transmitter 105 the synchronization unit 106 is configured to provide a primary synchronization signal and a secondary synchronization signal having first and second segments. The secondary scrambling unit 107 is configured to provide a scrambled secondary synchronization signal wherein scrambling agents for the first and second segments are derived from a primary synchronisation sequence of the primary synchronization signal. In one embodiment, the secondary scrambling unit 107 is further configured to provide an additional scrambling of one of the first and second segments, wherein a second scrambling agent is derived from the remaining segment of a secondary synchronization sequence of the secondary synchronization signal. The transmit unit 108 is configured to transmit the primary synchronization signal and the scrambled secondary synchronization signal.

In the UE receiver 110, the receive unit 111 is configured to receive the primary synchronization signal and the scrambled secondary synchronization signal having even and odd segments, and the primary synchronisation unit 112 is configured to detect the primary synchronization signal. The secondary synchronization unit 113 is configured to detect the scrambled secondary synchronization signal having a scrambling agent for the even and odd segments, wherein the scrambling agent is derived from a primary synchronisation sequence of the primary synchronisation signal.

In one embodiment, the secondary synchronization unit 113 is further configured to detect the scrambled secondary synchronization signal having an additional scrambling of one of the even and odd segments, wherein a second scrambling agent is derived from a remaining segment of a secondary synchronization sequence of the secondary synchronization signal.

Figure 2:
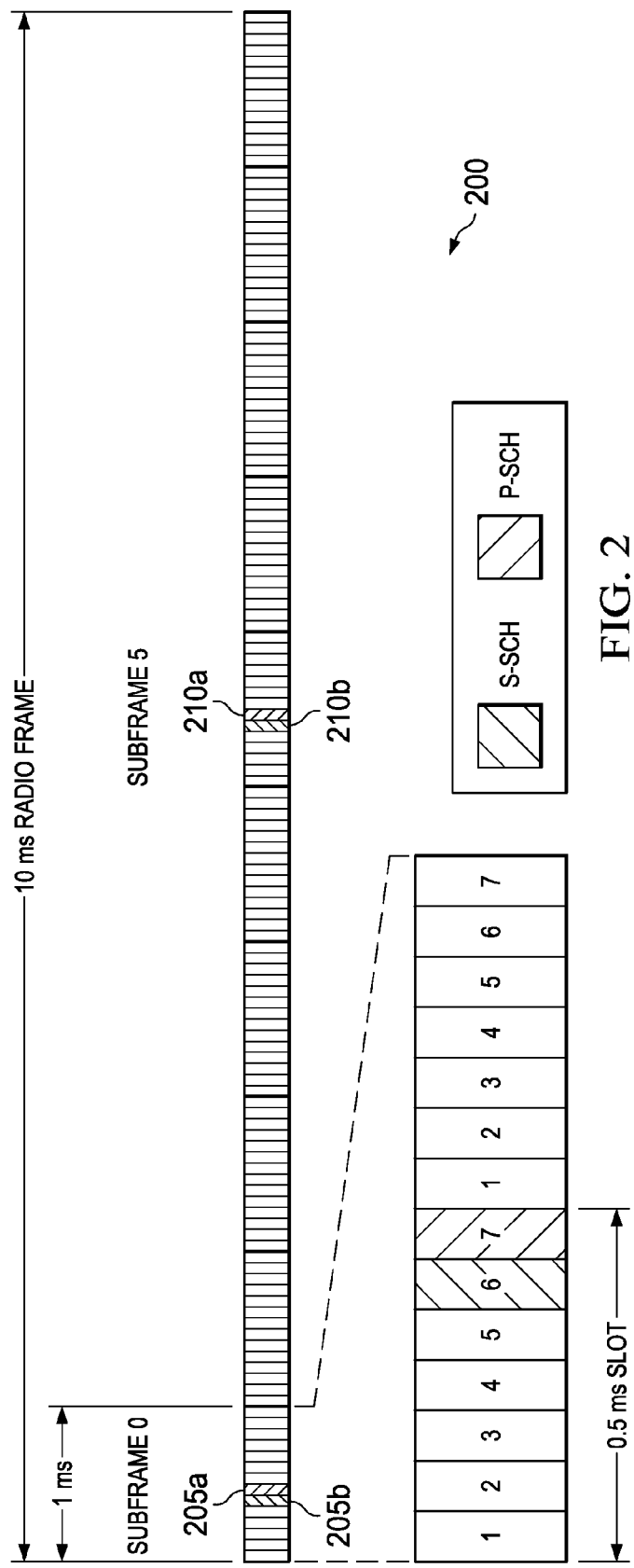
FIG. 2 illustrates a diagram of a downlink (transmit) radio frame that includes a downlink synchronization signal constructed according to the principles of the present disclosure.

FIG. 2 illustrates a diagram of a downlink (transmit) radio frame 200 that includes a downlink synchronization signal constructed according to the principles of the present disclosure. The downlink radio frame 200 may be employed in a cellular network, such as the cellular network 100 of FIG. 1, and includes two synchronization signals 205, 210 wherein each consists of a primary synchronization signal (also referred to as P-SCH) 205a or 210a and a secondary synchronization signal (also referred to as S-SCH) 205b or 210b that are located as shown. One P-SCH 205a or 210a and one corresponding S-SCK 205b or 210b symbol are transmitted every 5 ms epoch, as shown. Design of the synchronization signals to enable fast cell search is required for long-term evolution (LTE) of 3GPP.

An underlying representation for the P-SCH 205a or 210a is called a primary synchronization signal (PSS), which corresponds to a primary synchronization code (PSC) or sequence. The PSS for each cell is chosen from three sequences and is tied to the cell Identity (ID) within a certain group of cell IDs. Hence, the PSS conveys partial cell ID information and one PSS symbol carries three cell ID hypotheses. An underlying representation for the S-SCH 205b or 210b is called a secondary synchronization signal (SSS), which corresponds to a secondary synchronization code (SSC) or sequence. The SSS 205b or 210b carries cell-specific information. The following cell-specific information may be carried in one SSS symbol.

A total of 504 cell IDs are supported in LTE. Since three cell ID hypotheses are carried in the PSS 205, 168 cell ID groups (168 hypotheses) are provided. Additionally, since there are two SSS symbols per radio frame 200 (one in the first subframe (subframe 0), and another one in the sixth subframe (subframe 5), a radio frame timing indicator (2 hypotheses) is also provided. In some embodiments, a frequency hopping indicator for a downlink reference signal (2 hypotheses) may be provided that indicates if frequency hopping is employed within the radio frame 200. Additionally, an antenna configuration of transmitter (TX) diversity indicator (2 or 3 hypotheses) may also be provided that indicates either the antenna configuration or TX diversity employed by the broadcast channel (BCH).

The SSS may be detected coherently (by using the PSS as a phase reference) or non-coherently (without phase reference). This option is considered for the SSS in the following embodiments. In general, coherent detection yields better performance. Additionally, a two-segment SSS is employed where two groups of M-sequences with half-length (31) may be used to construct a large number of composite sequences. The two sequences may be either interleaved or staggered.

FIG. 3A illustrates an embodiment of a primary synchronization signal 300 constructed according to the principles of the present disclosure. FIG. 3A shows a mapping in the frequency domain of a PSS corresponding to the primary synchronization signal (PSS) 300 that occupies a center 63 sub-carriers, as shown. The mapping also Includes a DC sub-carrier and the data sub-carriers. This mapping assumes that there are 31 sub-carriers to both the left and right of the DC sub-carrier.

Since coherent SSS detection offers better performance than non-coherent detection in most scenarios, the PSS and SSS designs accommodate accurate coherent SSS detection. Additionally, since the PSS is used as a phase reference (to provide channel estimates) for decoding the SSS (demodulating the SSS), the SSS occupies exactly the same set of sub-carriers as the PSS in the illustrated embodiment.

FIG. 3B illustrates an embodiment of a scrambled secondary synchronization signal (SSS) mapping 350 based on employing two segments and constructed according to the principles of the present disclosure. The SSS mapping 350 occupies the center 63 sub-carriers as discussed with respect to FIG. 3A. The mapping includes the DC sub-carrier 301 and data sub-carriers, as before. Here, the mapping shows an interleaving of sub-carriers representing even and odd scrambled sequences of a two-segment, interleaved SSS.

In this case, the underlying SSS is of length-31 (two length-31 sequences interleaved in the frequency domain). Several natural candidates are M-sequences (pseudo noise (PN) sequences), Gold sequences, and truncated Walsh sequences. With Walsh sequences, the underlying length is 32, with one sample truncated. Other designs are also possible.

Referring again to FIG. 1, the following concerns and issues are addressed by embodiments of the present disclosure. For a two-level or two-segment design of the SSS, different SSS approaches may be considered for LTE. For example, consider two identical sets of 32 Walsh-Hadamard codes of length 32 or 31 each wherein a product of the two code sets is taken to generate potentially 1024 codes. Then, either 340 or 680 SSCs may be chosen. Thus, the SSCs are given by $\{W_i, W_j\}$ where i=1, ..., 32, j=1, ..., 32, and each of the $\{W_i\}$; i=1, ..., 32 and $\{W_j\}$; j=1, ..., 32 are identical sets of Walsh-Hadamard codes. Let each code $\{W_i\}$, be given by $\{w_i^1, ..., w_i^l, ..., w_i^L\}$; and an element $w_i^l \in \{0,1\}$. Normally 32 Walsh-Hadamard codes may be considered, wherein their length is 32. However, the last bit can be punctured, to get a length 31 code from the length 32 Hadamard code.

Another approach is to start with a length 31 Pseudo Noise (PN) code C. Then consider the 31 cyclic shifts of this code. Let the cyclic shift of k of the code C be denoted by $C_k$. Now consider the set of these cyclic shifted codes $\{C_k\}$; k=1, 2, ..., 31 and again construct 961 codes by $\{C_i, C_j\}$; i=1, ..., 31 and j=1, ..., 31. Again, 340 or 680 codes out of these may be used for SSCs.

One problem is that if the above structure is employed for SSC design, then it has a drawback when one or more base stations are interfering with a given base station. Let $\{W_{i_1}, W_{j_1}\}$ be the SSC set of a first base station and $\{W_{i_2}, W_{j_2}\}$ be the SSC set of a second base station. In this case, when the second base station is interfering with the first base station, a mobile user at the cell boundary of the first and second base stations could also confuse the above code sets to $\{W_{i_2}, W_{j_1}\}$ and $\{W_{i_1}, W_{j_2}\}$. If the mobile user detects these code sets, then it would indeed be locking onto a base station which is not in the vicinity, and it would be a long process before the mobile user realizes this.

Embodiments of the present disclosure provide an SSC design that involves a scrambling code on the code set $\{W_j\}$ wherein the scrambling code is a function of the first code set $\{W_i\}$. Let $\{V_i\}$; i=1, ..., 32 (in a Walsh code case) be the scrambling codes wherein each of which $V_i$ is associated with $W_i$. Again, each code $\{V_i\}$, is given by $\{V_i^1, ..., V_i^l, ..., V_i^L\}$; and an element $V_i^l \in \{0,1\}$. Similarly, let $$W_j \oplus V_i = \{w_j^1 v_i^1, ..., w_j^L v_i^L\} \quad (1)$$

denote the scrambling of code $\{W_j\}$ by code $\{V_i\}$. Similarly, the scrambling of the PS codes $\{C_i\}$ can be defined.

There are several options for embodiments of the present disclosure. For convenience of notation, the embodiments assuming Walsh code based SSS designs, given above, are presented. However it is understood that the same design can also be extended to the PN code or M-sequence based SSS design or any other two-segment SSS design.

For embodiments related to a first option, the above given code design is accepted, namely the codes are represented as $\{W_i, V_i \oplus W_j\}$. A typical receiver for detecting the code set $\{W_i, W_j\}$ will do a Walsh Hadamard transform of the code set $\{W_i\}$ and the code set $\{W_j\}$ separately. Then it will sum up the correlation output of these code sets over all combinations to generate the correlation output for the code set $\{W_i, W_j\}$.

On the other hand, when there is scrambling used on the second segment, the mobile has to use as many Walsh transforms for the set $V_i \oplus W_j$ as the number of codes in set $W_i$. Thus, instead of needing only two Walsh transforms for the code set $\{W_i, W_j\}$, the mobile will need (one plus the number of codes in set $\{W_i\}$) 33 in the worst case. Thus the complexity of the Walsh transforms has increased 16 times.

A technique is employed by which the number of Walsh transforms can be reduced while still maintaining the advantage of code randomization. The code set $\{V_i\}$ is divided into three groups $\{V_i^1, V_i^2, V_i^3\}$ wherein each group corresponds to a PSC. For a given PSC, the scrambling codes would then be used only from the group corresponding to that particular PSC. The groups can be decided by a pre-existing mapping between the code set $\{W_i\}$ for a given PSC.

For example, for a first PSC the group may consist of only the scrambling code $\{V1, ..., V10\}$, implying that a given $\{W_i\}$ is mapped to $\{V_{mod_{10}(i)}\}$. Similarly for a second PSC, the group $\{W_i\}$ can be mapped to $\{V_{10+mod_{10}(i)}\}$, and for a third PSC, it is mapped to $\{V_{20+mod_{10}(i)}\}$. The advantage of tying the PSC to the group of scrambling codes is that only one third of the Walsh Hadamard transforms are needed for SSC detection, thereby reducing the complexity of the SSC detection. Note that this scheme still results in interference from the neighboring base stations. This is because the neighboring base stations will be assigned different PSCs.

For embodiments related to a second option, the code set $\{W_i\}$ is partitioned into M groups. Namely, m=$\{1,2, ... M\}$ such that for a given i there is a single m in this set (i.e., a many to one mapping). Let the number of PSCs possible be P that is denoted with a variable p; p=1,2, ... P and pick $\tilde{P} \leq P$. Then the code set $\{V_i\}$ has $\tilde{P}*M$ elements (the $\tilde{P}=3$ corresponding to the three PSCs in the case of LTE). Then, a given $W_i$ in the first segment of SSC for a given PSC p employs $V_{m+(p-1)\cdot M}$ for scrambling the code $W_i$ on the second segment.

In the particular case where M=1 (i.e., there is a single set in which the $\{W_i\}$ is partitioned) and $\tilde{P}=3$ (i.e., there are three PSCs), there are only three scrambling codes used. Other variations that are possible are, M=9 and $\tilde{P}=3$. Yet another variation is that instead of having concrete mapping like $\{V_{m+(p-1)\cdot M}\}$ for a given p and a given m, there is a mapping to an index i for code $V_i$ which is used as a scrambling code for $W_j$. This mapping may be stored in a look-up table in the base station and the mobile.

Embodiments related to a third option, involve also having a scrambling code on the first segment of the codes and further having this scrambling tied to the PSCs. The reason for introducing this scrambling on the first SSC segment is because, on the cell boundary (sector boundary), the mobile will receive SSC from multiple sectors or cells of the same base station. In the absence of scrambling on the first segment, the channel estimate for coherent detection obtained from the PSC, which is common to all the cells or sectors of a given base station, will not appropriately reflect the channel estimate of the first segment of the SSCs.

The resulting scrambling on the first segment can now be indicated as $(\tilde{V} \oplus W_i, W_j)$. Since the scrambling is linked to the PSC, there are only three scrambling codes for $\tilde{V}$. Another variation of the invention would then be where the scrambling is present on both the first segment as given in this current option, or also on the second segment as given in the first and second options above.

For embodiments related to a fourth option, a first variation relates to the selection of the 340 or so codes discussed above. M1 and M2 are defined as the number of codes that are used for the first and second segments of the SSC, respectively. There are two ways in which these codes can be selected. Pick M1 of the 31 length-31 codes defined above for $W_i$, and pick M1 of the 31 length-31 codes for $W_j$ such that M1*M2 is an integer greater than 340. If M1=18 and M2=19 are picked, this condition is satisfied with M1*M2=342.

This gives a balanced number of codes for the first and second segments of the SSC. Similarly for M2=31 and M1=11, M1*M2=341. For this combination of (M1,M2) f any of the scrambling schemes given in the first, second and third options can be used. One such embodiment is as follows.

The first segment of the SSC is scrambled by a code corresponding to the PSC as in the third option. The second segment of the SSC is scrambled by one of the following alternatives.

(i) Employ a combination of PSC-dependent scrambling (it may be the same or different from that used in the first segment of the SSC) and a scrambling code $V_i$ on the second segment of SSC which is dependent on the first segment of the SSC (analogous to the second option). In this case, $\tilde{P}=3$. Note that $V_i$ may have a one-to-one correspondence with the first segment of the SSC (i.e., no grouping is used) or a one-to-many correspondence (i.e., grouping is used).

(ii) Employ a scrambling code $V_i$ on the second segment of SSC, which is dependent on the first segment of the SSC (analogous to the second option) without any PSC-dependent scrambling. In this case, $\tilde{P}=1$. Note that $V_i$ may have a one-to-one correspondence with the first segment of the SSC (i.e., no grouping is used) or a one-to-many correspondence (i.e., grouping is used).

(iii) Employ a PSC-dependent scrambling (different from that used in the first segment of the SSC) without the SSC-dependent scrambling of the first option. This can be viewed as a combination of the first and third options.

The embodiment with M1=11 and M2=31 is better from an implementation perspective because there are only 11 combinations for M2=31 code set of $\{W_j\}$. Note that any other combination of M1,M2) is also possible.

A second variation of the fourth option is related to the selection of the above 170 or so codes. This is relevant for the SSC structure where the first-segment and second-segment code set assignment is swapped across the two sub-frames within one radio frame. M1 and M2 are defined as the number of codes that are used for the first and second segments of the SSC, respectively. There are two ways in which these codes can be selected. Pick M1 of the 31 length-31 codes defined above for $W_i$, and pick M2 of the 31 length-31 codes for $W_j$ such that M1*M2 is an integer greater than 170.

If M1=13 and M2=14 are picked, this condition is satisfied with M1*M2=182. This gives a balanced number of codes for the first and second segments of the SSC. Similarly for M2=31 and M1=6, M1*M2=186. For this combination of (M1,M2), any of the scrambling schemes give in the first, second and third options can be used. One such embodiment follows:

The first segment of the SSC is scrambled by a code corresponding to the PSC as presented in the third option. The second segment of the SSC is scrambled by one of the following alternatives.

(i) Employ a combination of PSC-dependent scrambling (it may be the same or different from that used in the first segment of the SSC) and a scrambling code $V_i$ on the second segment of the SSC, which is dependent on the first segment of the SSC (analogous to the second option). In this case, $\tilde{P}=3$. Note that $V_i$ may have a one-to-one correspondence with the first segment of the SSC (i.e., no grouping is used) or a one-to-many correspondence (i.e., grouping is used).

(ii) Employ a scrambling code $V_i$ on the second segment of the SSC, which is dependent on the first segment of the SSC (analogous to the second option) without any PSC-dependent scrambling. In this case, $\tilde{P}=1$. Note that $V_i$ may have a one-to-one correspondence with the first segment of the SSC (i.e., no grouping is used) or a one-to-many correspondence (i.e., grouping is used).

(iii) Employ a PSC-dependent scrambling (different from that used in the first segment of the SSC) without an SSC-dependent scrambling of the first option. This can be viewed as a combination of the first and third options. Note that any other combination of (M1,M2) is also possible.

For embodiments related to a fifth option, the scrambling code design is addressed. For the sake of clarity, the net scrambling code design for both the Walsh code based SSC and the PM code based SSC are given. In the Walsh code based SSC, rotation of a given base sequence with good auto-correlation properties is used. In particular, the base sequence can be a Golay sequence of length 31/32, or it can also be the rotated PN sequence $\{C_i\}$. These rotated sequences may be used as the scrambling codes for the Walsh code based SSC. Thus, the scrambling code $\{V_i\}=\{C_i\}$. The chosen PN code or M-sequence can be any of the ones given in Table 1 below.

For code based SSC, let B be another PN code of length-31. Note that there are six PN sequences of length-31. The six PN codes are given in Table 1 below. In this case, the scrambling code is used as a rotated PN sequence, which is different from the rotated PN sequence for the SSC.

TABLE 1

PN sequences of length-31

| Code 1 | Code 2 | Code 3 | Code 4 | Code 5 | Code 6 |
|--------|--------|--------|--------|--------|--------|
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 1 |
| 1 | 1 | 1 | 1 | 1 | 0 |
| 1 | 1 | 0 | 0 | 1 | 0 |
| 0 | 0 | 1 | 1 | 1 | 1 |
| 0 | 1 | 1 | 0 | 0 | 0 |
| 1 | 0 | 0 | 1 | 0 | 1 |
| 0 | 1 | 1 | 1 | 1 | 1 |
| 0 | 0 | 0 | 1 | 1 | 0 |
| 1 | 0 | 1 | 0 | 0 | 0 |
| 1 | 1 | 0 | 1 | 1 | 1 |
| 1 | 0 | 0 | 1 | 1 | 1 |
| 1 | 0 | 0 | 0 | 1 | 1 |
| 1 | 0 | 1 | 0 | 1 | 1 |
| 0 | 1 | 1 | 0 | 1 | 1 |

TABLE 1-continued

PN sequences of length-31

| Code 1 | Code 2 | Code 3 | Code 4 | Code 5 | Code 6 |
|---|---|---|---|---|---|
| 1 | 0 | 1 | 1 | 0 | 0 |
| 1 | 1 | 0 | 1 | 1 | 0 |
| 1 | 1 | 1 | 1 | 0 | 0 |
| 0 | 1 | 1 | 1 | 0 | 1 |
| 0 | 1 | 1 | 1 | 0 | 1 |
| 0 | 1 | 1 | 0 | 1 | 0 |
| 1 | 0 | 1 | 0 | 0 | 1 |
| 0 | 1 | 0 | 1 | 0 | 1 |
| 1 | 1 | 0 | 1 | 1 | 1 |
| 0 | 0 | 1 | 0 | 0 | 0 |
| 1 | 0 | 0 | 1 | 1 | 1 |
| 1 | 1 | 0 | 0 | 0 | 0 |
| 0 | 1 | 1 | 0 | 1 | 1 |
| 1 | 1 | 1 | 1 | 1 | 0 |

Figure 4:
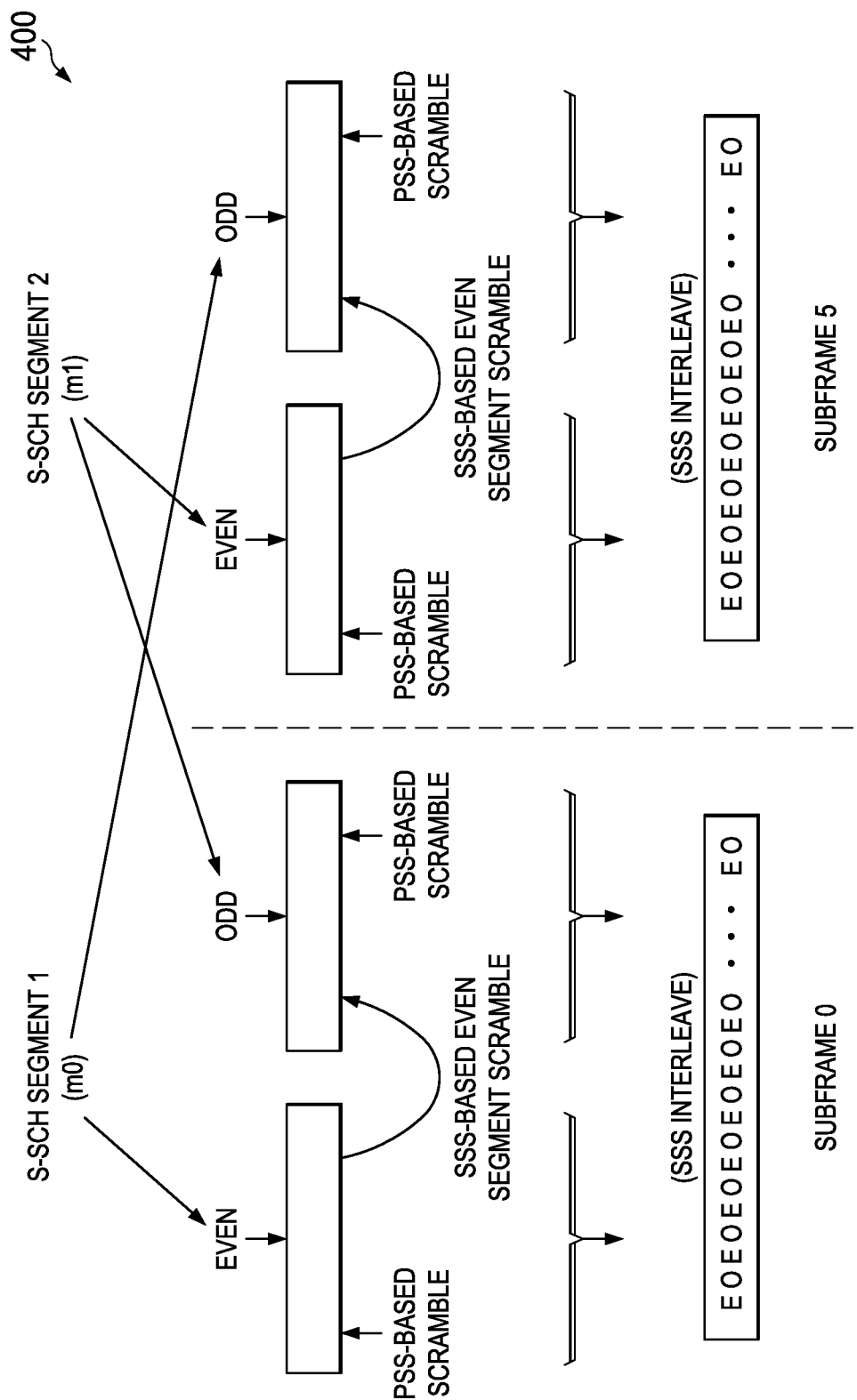
FIG. 4 illustrates a diagram of an embodiment of secondary synchronization sequence scrambling constructed according to the principles of the present disclosure.

FIG. 4 illustrates a diagram 400 of an embodiment of secondary synchronisation sequence scrambling constructed according to the principles of the present disclosure. The diagram 400 includes first and second SSS segments as may foe employed in subframes 0 and 5 of FIG. 2 above (indicated by m0 and m1, respectively). In subframe 0, the first SSS segment is provided as an even sequence, and in subframe 5, it is provided as an odd sequence, as shown. Correspondingly, in subframe 5, the second SSS segment is provided as an even sequence, and in subframe 0, it is provided as an odd sequence, as shown. This action causes the swapping of the two SSS sequences in subframes 0 and 5, which corresponds to the first variation of the fourth option discussed above.

Each of the even and odd sequences is initially scrambled wherein scrambling agents for both employ a PSS corresponding to PSS segments in subframes 0 and 5 of FIG. 2. This corresponds to the third option discussed above. Then, an additional scrambling of each of the odd sequences is provided by a second scrambling agent employing the corresponding even SSS of each subframe, as shown. In one embodiment, the second scrambling agent may also correspond to one of a number of groups in the corresponding even SSS, wherein the number of groups is equal to eight. This corresponds to a combination of the first and second options discussed above. The resulting even and odd scrambled sequences are interleaved as shown in FIG. 3B above.

Figure 5:
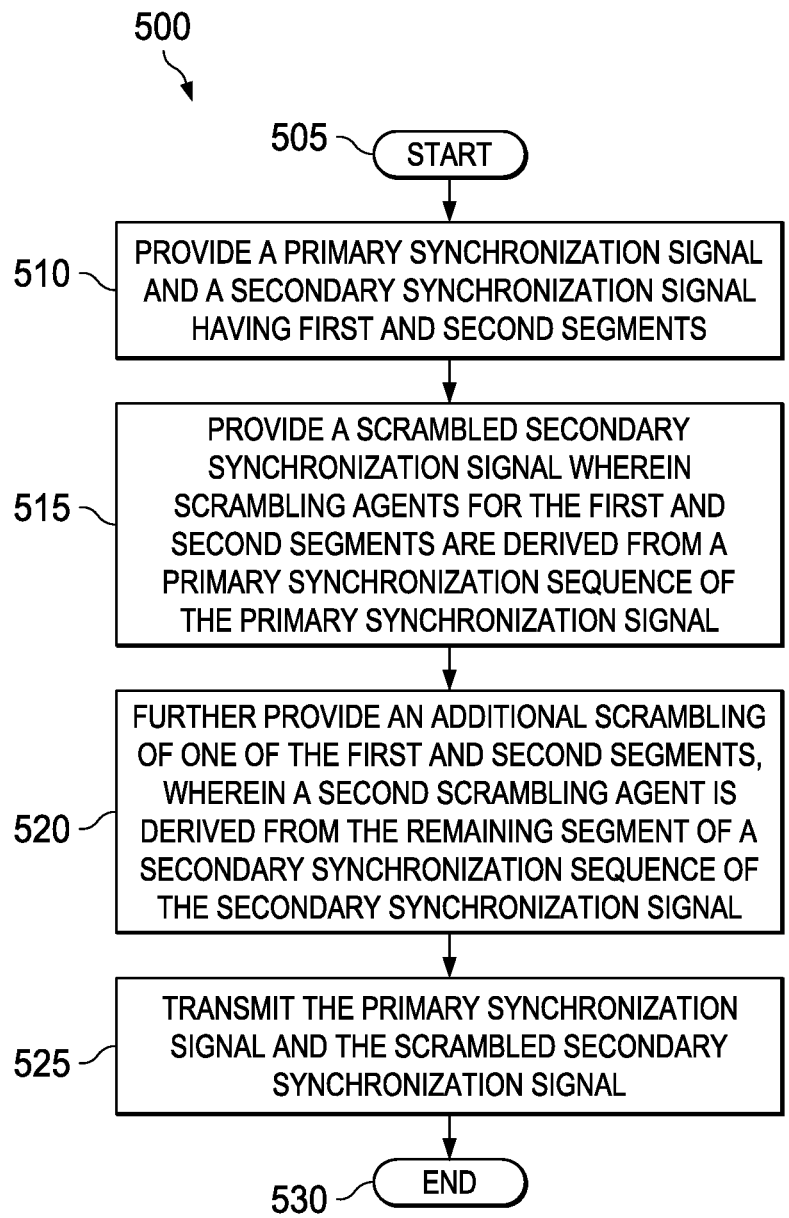
FIG. 5 illustrates a flow diagram of an embodiment of a method of operating a transmitter carried out in accordance with the principles of the present disclosure.

FIG. 5 illustrates a flow diagram of an embodiment of a method of operating a transmitter 500 carried out in accordance with the principles of the present disclosure. The method 500 is for use with a base station in an OFDMA system and starts in a step 505. Then, a primary synchronization signal and a secondary synchronization signal having first and second segments are provided, in a step 510. In one embodiment, the primary synchronization sequence is a length-31 sequence. Additionally, the primary synchronization sequence is derived from an M-sequence.

A scrambled secondary synchronization signal, wherein scrambling agents for the first and second segments are derived from a primary synchronization sequence of the primary synchronization signal is provided in a step 515. In one embodiment, an additional scrambling of one of the first and second segments, wherein a second scrambling agent is derived from the remaining segment of a secondary synchronization sequence of the secondary synchronization signal is further provided in a step 520.

In one embodiment, the second scrambling agent is the first segment employed in a first subframe of a transmit radio frame having 10 sub-frames. Additionally, the second scrambling agent is the second segment employed in a sixth subframe of the transmit radio frame having 10 subframes.

In one embodiment, the second scrambling agent corresponds to one of a number of groups in the remaining segment of the secondary synchronization sequence. Correspondingly, the number of groups is eight. The scrambled secondary synchronization signal provides even and odd scrambled sequences that are interleaved. Additionally, the scrambled secondary synchronization signal provides even and odd scrambled segments that are each length-31 sequences. The primary synchronization signal and the scrambled secondary synchronization signal are transmitted in a step 525. The method 500 ends in a step 530.

Figure 6:
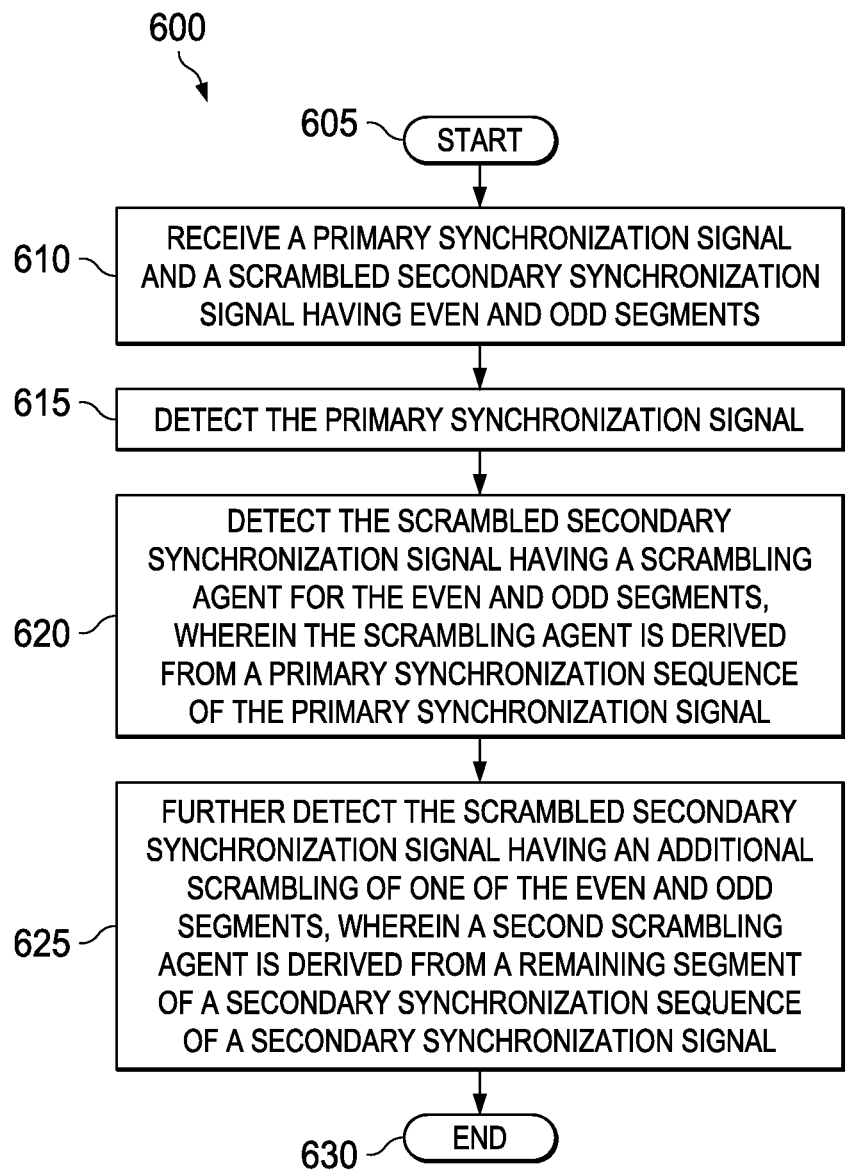
FIG. 6 illustrates a flow diagram of an embodiment of a method of operating a receiver carried out in accordance with the principles of the present disclosure.

FIG. 6 illustrates a flow diagram of an embodiment of a method of operating a receiver 600 carried out in accordance with the principles of the present disclosure. The method 600 is for use with user equipment in an OFDMA system and starts in a step 605. Then, a primary synchronization signal and a scrambled secondary synchronization signal having even and odd segments are received in a step 610. The primary synchronization signal is detected in a step 615.

The scrambled secondary synchronization signal having a scrambling agent for the even and odd segments is detected in a step 620, wherein the scrambling agent is derived from a primary synchronization sequence of the primary synchronization signal. In one embodiment, the primary synchronization sequence is a length-31 sequence. Additionally, the primary synchronization sequence is derived from an M-sequence.

In one embodiment, the scrambled secondary synchronization signal is further detected in a step 625 that has an additional scrambling of one of the even and odd segments, wherein a second scrambling agent is derived from a remaining segment of a secondary synchronization sequence of a secondary synchronization signal.

In one embodiment, the second scrambling agent is the first segment employed in a first subframe of a transmit radio frame having 10 subframes. Correspondingly, the second scrambling agent is the second segment employed In a sixth subframe of a transmit radio frame having 10 subframes.

In one embodiment, the second scrambling agent corresponds to one of a number of groups in the remaining segment. Correspondingly, the number of groups is eight. The scrambled secondary synchronization signal provides even and odd sequences that are interleaved. Additionally, the even and odd sequences are each length-31 sequences. The method 600 ends in a step 630.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which the disclosure relates will appreciate that other and further additions, deletions, substitutions and modifications may be made to the described example embodiments without departing from the disclosure.

What is claimed is:

1. A receiver, comprising:
   a receive unit configured to receive a primary synchronization signal and a scrambled secondary synchronization signal having at least two segments;
   a synchronization unit configured to detect the primary synchronization signal, the synchronization unit further configured to detect the scrambled secondary synchronization signal wherein the scrambling of the scrambled secondary synchronization signal is derived from a primary synchronization sequence of the primary synchronization signal, the receiver further configured to use the scrambled secondary synchronization signal to connect to a cellular network and to prepare for handover to a neighboring cell of the cellular network.

2. The receiver as recited in claim 1 wherein the primary synchronization sequence is a length-31 sequence.

3. The receiver as recited in claim 1 wherein the primary synchronization sequence is derived from an M-sequence.

4. The receiver as recited in claim 1 further configured to detect the scrambled secondary synchronization signal having an additional scrambling of one of the at least two segments, wherein a second scrambling agent is derived from a remaining segment of a secondary synchronization sequence of a secondary synchronization signal.

5. The receiver as recited in claim 4 wherein the second scrambling agent is a first segment employed in a first subframe of a transmit radio frame having 10 subframes.

6. The receiver as recited in claim 4 wherein the second scrambling agent is a second segment employed in a sixth subframe of a transmit radio frame having 10 subframes.

7. The receiver as recited in claim 4 wherein the second scrambling agent corresponds to one of a number of groups in the remaining segment.

8. The receiver as recited in claim 7 wherein the number of groups is eight.

9. The receiver as recited in claim 4 wherein the scrambled secondary synchronization signal provides even and odd sequences that are interleaved.

10. The receiver as recited in claim 9 wherein the even and odd sequences are each length-31 sequences.

11. The receiver as recited in claim 1 wherein the receiver is configured to determine a partial cell identity corresponding to the primary synchronization signal.

12. The receiver as recited in claim 11 wherein the partial cell identity distinguishes between 3 cells within a group of cell identities.

13. The receiver as recited in claim 12 wherein there are three cell ID hypotheses carried in the primary synchronization signal.

14. The receiver as recited in claim 13 wherein there are three cell ID hypotheses carried in the primary synchronization signal and 168 cell ID groups are provided.

15. The receiver as recited in claim 1 wherein there are two secondary synchronization symbols per radio frame.

16. The receiver as recited in claim 15 wherein one of the synchronization symbols is in the first subframe of the radio frame and the other synchronization symbol is in the sixth subframe of the radio frame.

17. The receiver as recited in claim 1 wherein the receiver is configured to determine a cell ID group corresponding to the scrambled secondary synchronization signal.

18. The receiver as recited in claim 1 wherein the receiver is configured to determine a partial cell identity corresponding to the primary synchronization signal and a cell ID group corresponding to the scrambled secondary synchronization signal.

19. The receiver as recited in claim 1 wherein the scrambled secondary synchronization signal carries cell-specific information.

20. The receiver as recited in claim 19 wherein the cell-specific information is carried in one secondary synchronization signal symbol.

21. The receiver as recited in claim 20 wherein the scrambled secondary synchronization signal is detected coherently or non-coherently.

22. The receiver as recited in claim 21 wherein coherent detection is enabled by using the primary synchronization signal as a phase reference and non-coherent detection is enabled without a phase reference.

23. The receiver as recited in claim 1 wherein the primary synchronization signal occupies a center 63 sub-carriers.

24. The receiver as recited in claim 23 wherein the center 63 sub-carriers comprises a DC sub-carrier and 31 sub-carriers to both the left and rights of the DC sub-carrier.

25. The receiver as recited in claim 1 wherein the receiver is configured to function in a cellular network comprising a cellular grid having a centric cell and at least six surrounding first-tier cells.

26. The receiver as recited in claim 1 wherein one of the at least two segments is an even segment and the other of the at least two segments is an odd segment.

27. A method of operating a receiver, comprising:
receiving a primary synchronization signal and a scrambled secondary synchronization signal having at least two segments;
detecting the primary synchronization signal; and
detecting the scrambled secondary synchronization signal wherein the scrambling of the scrambled secondary synchronization signal is derived from a primary synchronization sequence of the primary synchronization signal.

28. The method as recited in claim 27 wherein the primary synchronization sequence is a length-31 sequence.

29. The method as recited in claim 27 wherein the primary synchronization sequence is derived from an M-sequence.

30. The method as recited in claim 27 further detecting the scrambled secondary synchronization signal having an additional scrambling of one of the at least two segments, wherein a second scrambling is derived from a remaining segment of a secondary synchronization sequence of a secondary synchronization signal.

31. The method as recited in claim 30 wherein the second scrambling occurs is a first segment employed in a first subframe of a transmit radio frame having 10 subframes.

32. The method as recited in claim 30 wherein the second scrambling occurs in a second segment employed in a sixth subframe of a transmit radio frame having 10 subframes.

33. The method as recited in claim 30 wherein the second scrambling occurs in one of a number of groups in the remaining segment.

34. The method as recited in claim 33 wherein the number of groups is eight.

35. The method as recited in claim 30 wherein the scrambled secondary synchronization signal provides even and odd sequences that are interleaved.

36. The method as recited in claim 35 wherein the even and odd sequences are each length-31 sequences.

37. The method as recited in claim 27 further including the step of determining a partial cell identity corresponding to the primary synchronization signal.

38. The method as recited in claim 37 wherein the partial cell identity distinguishes between 3 cells within a group of cell identities.

39. The method as recited in claim 38 wherein there are three cell ID hypotheses carried in the primary synchronization signal.

40. The method as recited in claim 38 wherein there are three cell ID hypotheses carried in the primary synchronization signal and 168 cell ID groups are provided.

41. The method as recited in claim 27 wherein there are two secondary synchronization symbols per radio frame.

42. The method as recited in claim 41 wherein one of the synchronization symbols is in the first subframe of the radio frame and the other synchronization symbol is in the sixth subframe of the radio frame.

43. The method as recited in claim 27 wherein the receiver is configured to determine a cell ID group corresponding to the scrambled secondary synchronization signal.

44. The method as recited in claim 27 wherein the receiver is configured to determine a partial cell identity corresponding to the primary synchronization signal and a cell ID group corresponding to the scrambled secondary synchronization signal.

45. The method as recited in claim 27 wherein the scrambled secondary synchronization signal carries cell-specific information.

46. The method as recited in claim 45 wherein the cell-specific information is carried in one secondary synchronization signal symbol.

47. The method as recited in claim 46 wherein the secondary synchronization signal is detected coherently or non-coherently.

48. The method as recited in claim 47 wherein coherent detection is enabled by using the primary synchronization signal as a phase reference and non-coherent detection is enabled without a phase reference.

49. The method as recited in claim 27 wherein the primary synchronization signal occupies a center 63 sub-carriers.

50. The method as recited in claim 49 wherein the center 63 sub-carriers comprises a DC sub-carrier and 31 sub-carriers to both the left and rights of the DC sub-carrier.

51. The method as recited in claim 27 wherein the receiver is configured to function in a cellular network comprising a cellular grid having a centric cell and at least six surrounding first-tier cells.

52. The receiver as recited in claim 27 wherein one of the at least two segments is an even segment and the other of the at least two segments is an odd segment.

\* \* \* \* \*